United States Patent
Takeyasu et al.

(10) Patent No.: US 11,138,451 B2
(45) Date of Patent: Oct. 5, 2021

(54) TRAINING IMAGE SELECTION SYSTEM (71) Applicant: TOYOTA JIDOSHA KABUSHIKI KAISHA, Toyota (JP)

(72) Inventors: Satoshi Takeyasu, Musashino (JP); Daisuke Hashimoto, Chofu (JP); Kota Hirano, Tokyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 98 days.

(21) Appl. No.: 16/571,343

(22) Filed: Sep. 16, 2019

(65) Prior Publication Data
US 2020/0097741 A1  Mar. 26, 2020

(30) Foreign Application Priority Data
Sep. 25, 2018 (JP) .............. JP2018-179046

(51) Int. Cl.
*G06K 9/00* (2006.01)
*G06K 9/20* (2006.01)
*H04N 1/00* (2006.01)

(52) U.S. Cl.
CPC ....... *G06K 9/00825* (2013.01); *G06K 9/2027* (2013.01); *G06K 9/2081* (2013.01); *H04N 1/00172* (2013.01)

(58) Field of Classification Search
CPC ............. G06K 9/00825; G06K 9/2027; G06K 9/2081; H04N 1/00172
See application file for complete search history.

(56) References Cited

U.S. PATENT DOCUMENTS

| 10,061,322 | B1* | 8/2018 | Palefsky-Smith | G06N 3/084 |
| 10,414,395 | B1* | 9/2019 | Sapp | G01S 13/00 |
| 2019/0087672 | A1* | 3/2019 | Wang | G06K 9/6288 |
| 2019/0354786 | A1* | 11/2019 | Lee | G06N 7/005 |

OTHER PUBLICATIONS

Wei Liu et al. "SSD: Single Shot MultiBox Detector", ECCV2016, 2016, p. 1-17.
Shaoqing Ren et al. "Faster R-CNN: Towards Real-Time Object Detection with Region Proposal Networks", NIPS, 2015, p. 1-14.

* cited by examiner

*Primary Examiner* — David F Dunphy
(74) *Attorney, Agent, or Firm* — Sughrue Mion, PLLC (57) ABSTRACT A training image selection system 1, 1' comprises: an imaging device 21, 22 capturing an outside of a host vehicle to generate images, a storage device 32 storing the images generated by the imaging device, a detecting part 34 configured to detect operation of signaling lights of the host vehicle, and an image selecting part 35 configured to select training images from the images generated by the imaging device. If the detecting part detects operation of signaling lights, the image selecting part is configured to select images generated at timings within a predetermined range from when operation of signaling lights is detected, as training images.

11 Claims, 6 Drawing Sheets

TRAINING IMAGE SELECTION SYSTEM

FIELD

The present invention relates to a training image selection system.

BACKGROUND

Known in the past has been the art of detecting an object from an image generated by a camera etc. For example, NPLs 1 and 2 describe that by using a neural network, it is possible to improve the accuracy of detection of an object.

In such a neural network, a predetermined parameter (weight etc.,) at each layer of the neural network is adjusted in advance by learning. In learning, an image labeled with a true label including the name of a known object is used as training data. By using a large number of training data to train a neural network, it is possible to raise the accuracy of detection of an object.

CITATION LIST

Non Patent Literature

[NPL 1] Wei Liu et al., "SSD: Single Shot MultiBox Detector", ECCV2016, 2016
[NPL 2] Shaoqing Ren et al., "Faster R-CNN: Towards Real-Time Object Detection with Region Proposal Networks", NIPS, 2015

SUMMARY

Technical Problem

In this regard, if a vehicle is running by automated driving, it is preferable to be able to detect operation of signaling lights such as turn lights or braking lights of other vehicles so as to predict traffic conditions, behavior of other vehicles, etc. To detect the operation of signaling lights using a trained neural network with a good accuracy, it is necessary to prepare a large number of training images including vehicles whose signaling lights are being operated. However, since situations where signaling lights are being operated are limited, it is difficult to extract the desired images from a massive amount of vehicle images.

Therefore, an object of the present invention is to efficiently acquire images including vehicles whose signaling lights are being operated.

Solution to Problem

The summary of the present disclosure is as follows.

(1) A training image selection system comprising: an imaging device capturing an outside of a host vehicle to generate images, a storage device storing the images generated by the imaging device, a detecting part configured to detect operation of signaling lights of the host vehicle, and an image selecting part configured to select training images from the images generated by the imaging device, if the detecting part detects operation of signaling lights, the image selecting part is configured to select images generated at timings within a predetermined range from when operation of signaling lights is detected, as training images.

(2) The training image selection system described in above (1), wherein the image selecting part configured to send the selected training images to an outside of the host vehicle.

(3) The training image selection system described in above (1) or (2), wherein the image selecting part configured to label the selected training images with the names of the signaling lights whose operation has been detected by the detecting part as true labels.

(4) The training image selection system described in any one of above (1) to (3), wherein the storage device stores only the latest images of a predetermined number of frames.

(5) The training image selection system described in any one of above (1) to (4), wherein the imaging device includes a front camera capturing a region in front of the host vehicle to generate images, and a rear camera capturing a region at a rear of the host vehicle to generate images, and wherein the predetermined range includes before and after when operation of the signaling lights was detected.

(6) The training image selection system described in any one of above (1) to (5), further comprising a judging part configured to judge whether predetermined conditions have been satisfied if the detecting part detects operation of the signaling lights, wherein if the detecting part detects operation of the signaling lights and the judging part judges that the predetermined conditions have been satisfied, the image selecting part is configured to select the images generated at timings within the predetermined range from when operation of the signaling lights is detected, as the training images.

(7) The training image selection system described in above (6), wherein the predetermined conditions include operation of the signaling lights being continued for a predetermined time.

(8) The training image selection system described in above (6) or (7), wherein the predetermined conditions include another vehicle being detected from at least one of the images generated at timings within the predetermined range from when operation of the signaling lights is detected.

(9) The training image selection system described in any one of above (6) to (8), wherein the predetermined conditions include the host vehicle being driven forward when operation of the signaling lights is detected.

(10) The training image selection system described in any one of above (6) to (9), wherein the predetermined conditions include the host vehicle being driven on a highway when operation of the signaling lights is detected.

Advantageous Effects of Invention

According to the present invention, it is possible to efficiently acquire images including vehicles whose signaling lights are being operated.

DESCRIPTION OF EMBODIMENTS

Below, referring to the drawings, embodiments of the present invention will be explained in detail. Note that, in the following explanation, similar component elements will be assigned the same reference notations.

First Embodiment

First, referring to FIG. 1 to FIG. 4, a first embodiment of the present invention will be explained.

<Configuration of Training Image Selection System>

Figure 1:
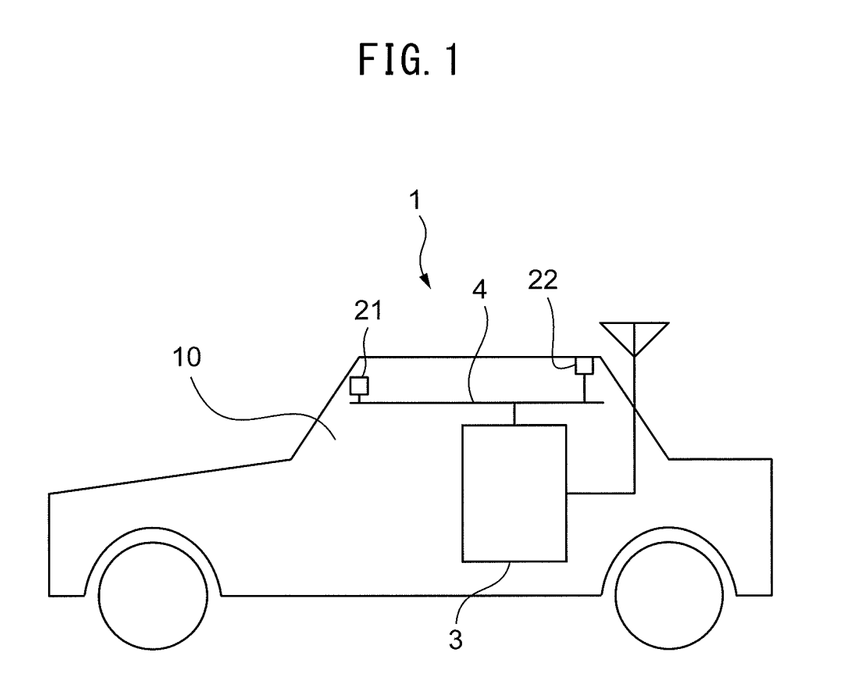
FIG. 1 is a view schematically showing a vehicle mounting a training image selection system according to a first embodiment of the present invention.

FIG. 1 is a view schematically showing a vehicle mounting a training image selection system according to a first embodiment of the present invention. The training image selection system 1 is mounted in a vehicle 10 and selects training images used for training a neural network for detecting an object.

In the present embodiment, the training image selection system 1 is provided with a front camera 21 and a rear camera 22 as image capturing devices for capturing the outside of the vehicle (host vehicle) 10 and generating images. The front camera 21 and the rear camera 22 respectively include lenses and imaging devices, for example, are CMOS (complementary metal oxide semiconductor) cameras or CCD (charge coupled device) cameras.

The front camera 21 is provided at the vehicle 10 to capture the region in front of the vehicle 10. For example, the front camera 21 is provided at a back surface of a room mirror of the vehicle 10. The front camera 21 captures the front region of the vehicle 10 at predetermined imaging intervals (for example, 1/30 second to 1/10 second) to generate images of the front region while the ignition switch of the vehicle 10 is on.

The rear camera 22 is provided at the vehicle 10 to captures the region at the rear of the vehicle 10. For example, the rear camera 22 is provided at a back part of the ceiling inside the passenger compartment. The rear camera 22 captures the rear region of the vehicle 10 at predetermined imaging intervals (for example, 1/30 second to 1/10 second) to generate images of the rear region while the ignition switch of the vehicle 10 is on.

Further, the training image selection system 1 is provided with an electronic control unit (ECU) 3. The ECU 3 is connected through an in-vehicle network 4 compliant with a standard such as the CAN (controller area network) to the front camera 21 and the rear camera 22 to be able to communicate with them. For this reason, the images generated by the front camera 21 and the images generated by the rear camera 22 are sent through the in-vehicle network 4 to the ECU 3.

Figure 2:
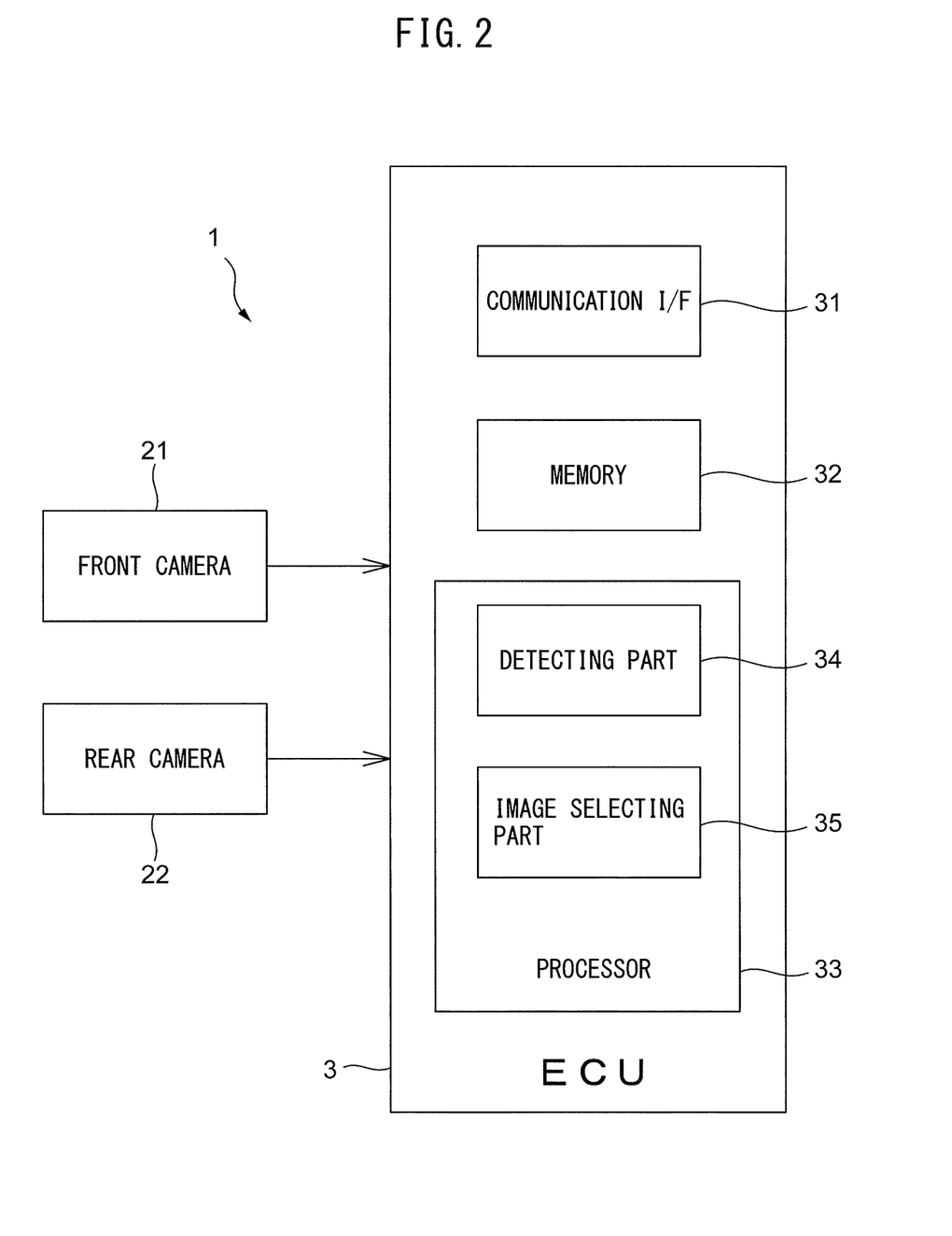
FIG. 2 is a view schematically showing the configuration of a training image selection system according to the first embodiment of the present invention.

FIG. 2 is a view schematically showing the configuration of the training image selection system according to the first embodiment of the present invention. As shown in FIG. 2, the ECU 3 includes a communication interface 31, a memory 32, and a processor 33. The communication interface 31 and memory 32 are connected through signal lines to the processor 33.

The communication interface 31 is an interface circuit for connecting the ECU 3 to the in-vehicle network 4. That is, the communication interface 31 is connected through the in-vehicle network 4 to the front camera 21 and the rear camera 22. The communication interface 31 receives images from the front camera 21 and the rear camera 22 and transfers the received images to the processor 33. The communication interface 31 is one example of a communication device.

The memory 32, for example, has a volatile semiconductor memory and nonvolatile semiconductor memory. The memory 32 stores various data etc., used when the processor 33 performs various processing. For example, the memory 32 stores images generated by the front camera 21 and images generated by the rear camera 22. The memory 32 is one example of a storage device.

The processor 33 has one or more CPUs (central processing units) and their peripheral circuits. Note that, the processor 33 may further have processing circuits such as logic processing units or numeric processing units. The processor 33 is one example of a control device.

In the present embodiment, the processor 33 has a detecting part 34 and an image selecting part 35 as functional blocks. The detecting part 34 detects the operation of signaling lights of the vehicle 10. The image selecting part 35 selects training images from the images generated by the front camera 21 and the rear camera 22.

These functional blocks are, for example, functional modules realized by a computer program running on the processor 33 of the ECU 3. Note that, these functional blocks may be dedicated processing circuits provided in the processor 33.

<Selection of Training Images>

In this regard, if a vehicle is running by automated driving, it is preferable to be able to detect operation of signaling lights such as turn lights or braking lights of other vehicles so as to predict traffic conditions, behavior of other vehicles, etc. To detect the operation of signaling lights using a trained neural network with a good accuracy, it is necessary to prepare a large number of training images including vehicles whose signaling lights are being operated.

As explained above, the front camera 21 and the rear camera 22 captures the surroundings of the vehicle 10. For this reason, the images generated by the front camera 21 and the rear camera 22 include images including vehicles whose signaling lights are being operated. However, if sending all generated images to the outside of the vehicle 10 for selection of the training images, the amount of data communicated would become enormous. Further, whether or not signaling lights of the vehicles in the images are operating is difficult for a human operator to judge instantaneously. For this reason, tremendous labor is required for extracting desired images from the enormous number of generated images.

The inventors of the present application engaged in in-depth studies and as a result discovered that a host vehicle and other vehicles around the host vehicle often exhibit similar behaviors. For example, if the vehicle 10 stops in front of a traffic light, there is a high possibility of the brakes being operated and the braking signaling lights being operated in the vehicle 10 and other vehicles around the vehicle 10. Further, if the vehicle 10 changes lanes due to a reduction in the number of lanes etc., there is a high possibility of the turn lights being operated in the vehicle 10 and other vehicles around the vehicle 10. Further, if the vehicle 10 is rapidly decelerating on a highway at the time of congestion, there is a high possibility of the hazard lights being operated in the vehicle 10 and other vehicles around the vehicle 10.

For this reason, if signaling lights of the vehicle 10 are operated, there is a high possibility of signaling lights of other vehicles around the vehicle 10 also being operated. That is, there is a high possibility that images generated by the front camera 21 and the rear camera 22 before and after the signaling lights of the vehicle 10 are being operated will include vehicles whose signaling lights are being operated.

Therefore, in the present embodiment, the image selecting part 35 selects the images generated at timings within a predetermined range from when operation of signaling lights is detected if the detecting part 34 detects operation of signaling lights, as training images. By doing this, in the present embodiment, it is possible to efficiently acquire images including vehicles whose signaling lights are being operated.

The signaling lights include, for example, the turn lights, braking lights, hazard lights, etc. The detecting part 34, for example, detects the on/off state of a turn light switch to detect operation of the turn lights of the vehicle 10. Note that, the detecting part 34 may detect presence or absence of power supply to the turn lights to detect operation of the turn lights of the vehicle 10.

Further, the detecting part 34, for example, detects the on/off state of a braking switch (stop light switch) to detect operation of the braking lights of the vehicle 10. Note that, the detecting part 34 may detect presence or absence of power supply to the braking lights to detect operation of the braking lights of the vehicle 10. Further, the detecting part 34, for example, detects the on/off state of a hazard switch to detect operation of the hazard lights of the vehicle 10. Note that, the detecting part 34 may detect presence or absence of power supply to the hazard lights to detect operation of the hazard lights of the vehicle 10.

The selected training images are used as training data for training a neural network for detection of an object. For example, images actually including vehicles whose signaling lights are being operated are extracted by a human operator from the selected training images. At this time, the training images in the enormous number of generated images have already been narrowed down, so a human operator can easily extract the desired training images. Note that, the desired training images may be extracted using a classifier such as a trained neural network.

Figure 3:
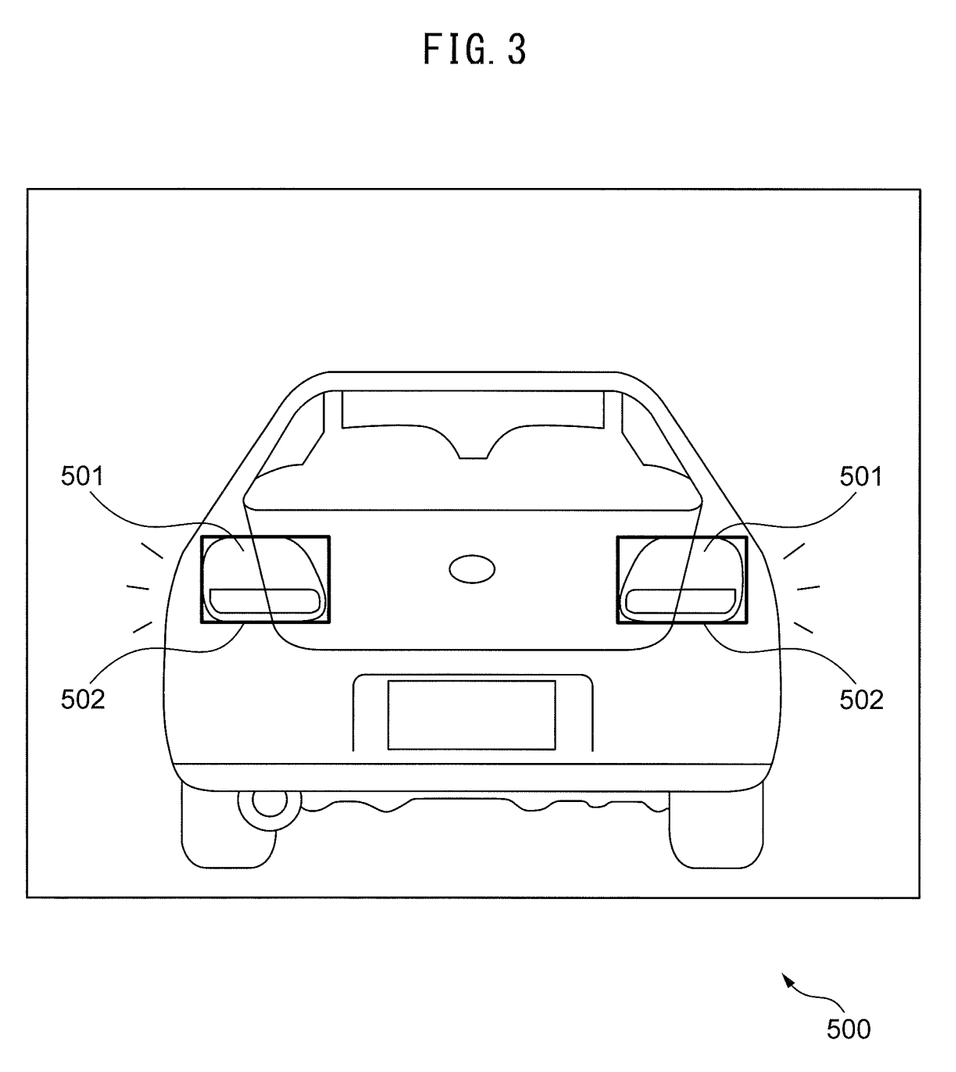
FIG. 3 shows an example of training data when what is detected is flashing of hazard lights.

Next, a human operator labels an extracted training image with a "true" label. A training image labeled with a true label is used as training data. FIG. 3 is one example of training data when what is detected is flashing of hazard lights. In this example, the training data 500 includes, as a true label, the center coordinates (x, y), width "w", and height "h" of a bounding box 502 showing a region in which signaling lights 501 are positioned and the name of the signaling lights 501 (in this example, hazard lights). The bounding box 502 is expressed as a circumscribing rectangle surrounding an object in the image.

The training of the neural network for detection of an object is performed by a learning method such as the error back propagation method using a large number of training data such as shown in FIG. 3. In the error back propagation method, the weights at the different layers of the neural network are updated so that the output of the neural network approaches a true label, that is, so that the value of the loss function becomes smaller.

Note that, a true label may be attached to a training image by the image selecting part 35. In this case, the image selecting part 35 gives the name of the signaling lights whose operation is being detected by the detecting part 34 to the selected training image as the true label. By doing this, the trouble of judging the type of the signaling lights being operated is reduced and the training data can be more easily prepared.

<Processing for Selecting Training Images>

Figure 4:
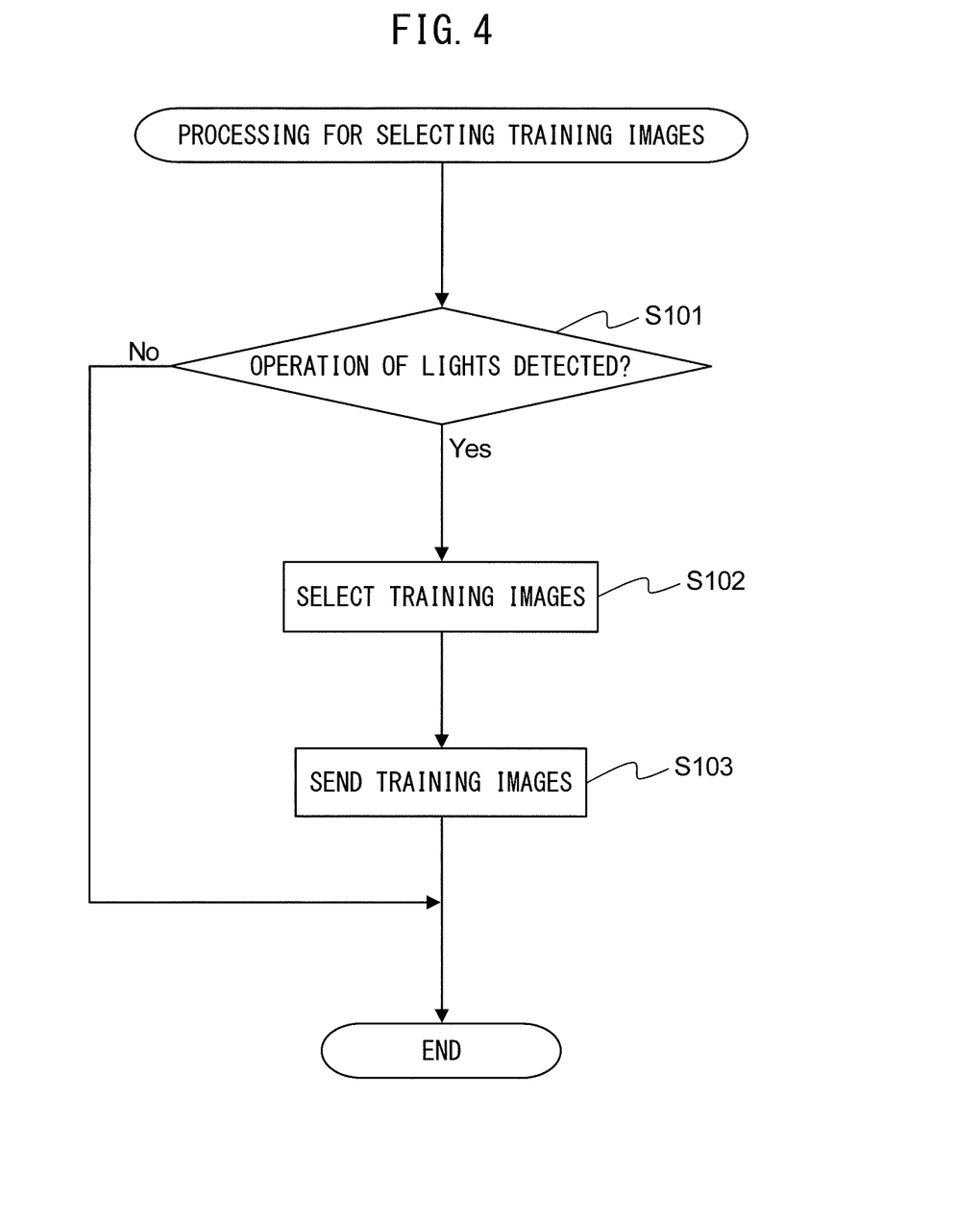
FIG. 4 is a flow chart showing a control routine of processing for selecting training images in the first embodiment.

Below, referring to the flow chart of FIG. 4, the control for selecting training images in the first embodiment will be explained. FIG. 4 is a flow chart showing a control routine of the processing for selecting training images in the first embodiment. The present control routine is repeatedly performed by the ECU 3.

First, at step S101, the image selecting part 35 judges whether the detecting part 34 has detected operation of signaling lights of the vehicle 10. If it is judged that the detecting part 34 has not detected operation of signaling lights of the vehicle 10, the present control routine ends. On the other hand, if it is judged that the detecting part 34 has detected operation of the signaling lights of the vehicle 10, the present control routine proceeds to step S102.

At step S102, the image selecting part 35 selects the training images from the images generated by the front camera 21 and the rear camera 22. Specifically, the image selecting part 35 selects the images generated at timings in a predetermined range from when the detecting part 34 detects operation of the signaling lights, as the training images.

The predetermined range is set in advance and, for example, includes before and after when the detecting part 34 detects operation of the signaling lights. For example, the predetermined range is a range from a predetermined time before operation of the signaling lights of the vehicle 10 is detected to after a predetermined time from when operation of the signaling lights of the vehicle 10 is detected. By doing this, it is possible to select as the training images an image of another vehicle whose signaling lights are being operated earlier than the vehicle 10 (typically, a vehicle in front of the vehicle 10) and an image of another vehicle whose signaling lights are being operated later than the vehicle 10 (typically, a vehicle at the rear of the vehicle 10). That is, it is possible to acquire an image including a front vehicle with signaling lights operated at the front and an image including a rear vehicle with signaling lights operated.

Note that, when the training images are selected, the images generated by the front camera 21 and the rear camera 22 are stored in the memory 32. The memory 32 temporarily stores the generated images. For example, the memory 32 updates the stored images each time images are generated and stores only the latest images of a predetermined number of frames. By doing this, it is possible to decrease the amount of the memory 32 used. The predetermined number of frames is set in advance. It is set to equal to or greater than the number of frames generated at timings within the predetermined range.

Next, at step S103, the image selecting part 35 sends the selected training images to the outside of the vehicle 10. For example, the image selecting part 35 sends the training images through the communication interface 31, a wireless base station, and a communication network to a server at the outside of the vehicle 10. By doing this, it is possible to prepare the training data and train the neural network using the training data in the server at the outside of the vehicle 10. Further, since the processing with high computational load, such as training of the neural network is performed at the outside of the vehicle 10, the processing load of the ECU 3 can be reduced. After step S103, the present control routine ends.

Second Embodiment

The configuration and control of the training image selection system according to the second embodiment are basically similar to the training image selection system according to the first embodiment except for the points explained below. For this reason, below, the second embodiment of the present invention will be explained focusing on parts different from the first embodiment.

Figure 5:
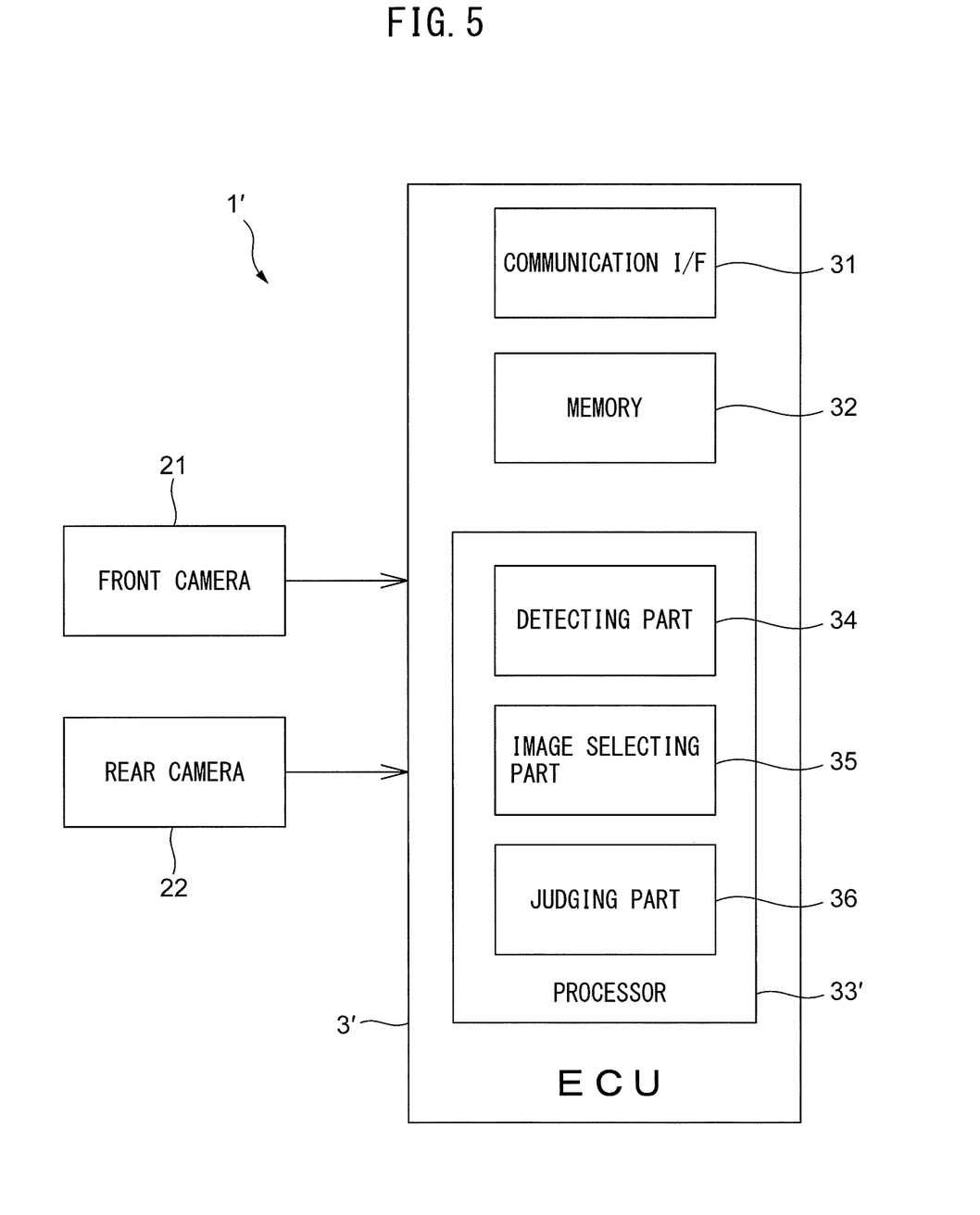
FIG. 5 is a view schematically showing the configuration of a training image selection system according to a second embodiment of the present invention.

FIG. 5 is a view schematically showing the configuration of the training image selection system according to the second embodiment of the present invention. In the same way as the first embodiment, the training image selection system 1' is provided with a front camera 21, a rear camera 22, and an ECU 3'. In the second embodiment, the processor 33' has a detecting part 34, image selecting part 35, and judging part 36 as functional blocks.

In this regard, even if the signaling lights of the vehicle 10 are operated, images of other vehicles whose signaling lights are being operated will not necessarily be generated. For example, images of other vehicles will not be generated if there are no other vehicles around the vehicle 10.

For this reason, if the detecting part 34 detects operation of the signaling lights, the judging part 36 judges whether predetermined conditions have been satisfied. Further, if the detecting part 34 detects operation of the signaling lights and the judging part 36 judges that the predetermined conditions have been satisfied, the image selecting part 35 selects the images generated at timings within a predetermined range from when operation of the signaling lights is detected, as the training images. By doing this, it is possible to raise the possibility of the selected training images including vehicles whose signaling lights are being operated.

The predetermined conditions include, for example, that the operation of the signaling lights of the vehicle 10 is continued for a predetermined time. By doing this, it is possible to keep images generated when mistaken operation causes the signaling lights of the vehicle 10 to be operated from being selected as training images.

Further, the predetermined conditions include that another vehicle is detected from at least one of the images generated at timings in a predetermined range from when operation of the signaling lights is detected. By doing this, it is possible to keep an image generated when there is no other vehicle present around the vehicle 10 from being selected as a training image.

Further, the predetermined conditions may include that the vehicle 10 is driven forward when operation of the signaling lights is detected. By doing this, it is possible to keep an image generated when the vehicle 10 is backing up for parking etc., from being selected as a training image.

Further, on a highway, compared with a general road, there is a high possibility of the host vehicle and other vehicles around the host vehicle exhibiting similar behavior. For this reason, the predetermined conditions may include that the vehicle 10 is driven on a highway when operation of the signaling lights is detected. By doing this, it is possible to keep an image generated in the case when signaling lights of the vehicle 10 are operated due to a right turn, parking, or other factor unique to the host vehicle from being selected as a training image.

<Processing for Selecting Training Images>

Figure 6:
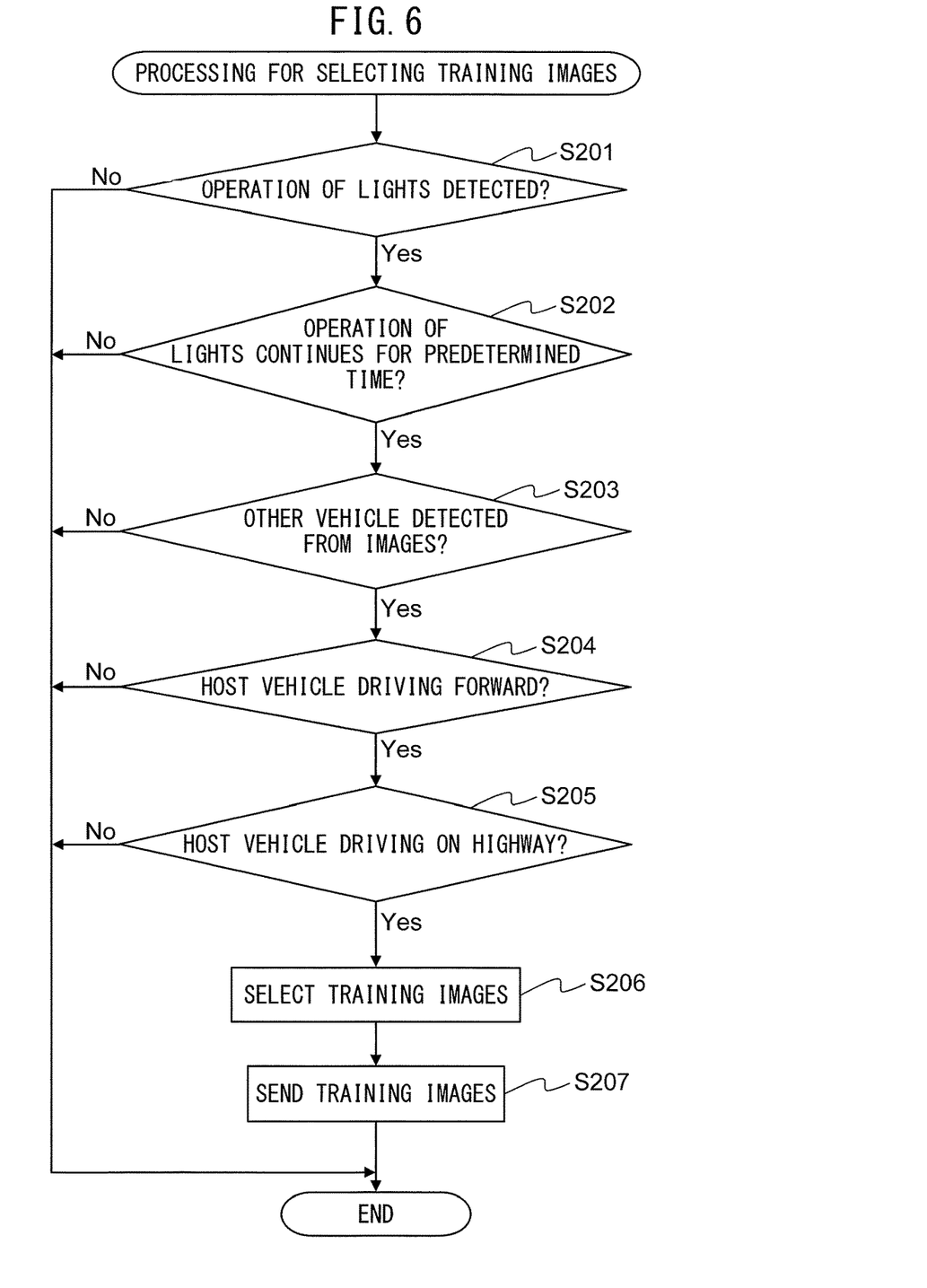
FIG. 6 is a flow chart showing a control routine of processing for selecting training images in the second embodiment.

FIG. 6 is a flow chart showing a control routine of processing for selecting training images in the second embodiment. The present control routine is repeatedly executed by the ECU 3.

First, at step S201, the image selecting part 35 judges whether the detecting part 34 has detected operation of the signaling lights. If it is judged that the detecting part 34 has not detected operation of the signaling lights, the present control routine ends. On the other hand, if it is judged that the detecting part 34 has detected operation of the signaling lights, the present control routine proceeds to step S202.

At step S202, the judging part 36 judges whether the operation of the signaling lights of the vehicle 10 has continued for a predetermined time. If it is judged that the operation of the signaling lights of the vehicle 10 has not continued for the predetermined time, the present control routine ends. On the other hand, if it is judged that the operation of the signaling lights of the vehicle 10 has continued for the predetermined time, the present control routine proceeds to step S203.

At step S203, the judging part 36 judges whether another vehicle was detected from at least one of the images generated at timings in a predetermined range from when operation of the signaling lights of the vehicle 10 was detected. At this time, the judging part 36 uses a classifier such as a trained neural network to detect other vehicles in the images. If at step S203 it is judged that other vehicles were not detected, the present control routine ends. On the other hand, if at step S203 it is judged that other vehicles were detected, the present control routine proceeds to step S204.

At step S204, the judging part 36 judges whether the vehicle 10 was driven forward when operation of the signaling lights of the vehicle 10 was detected. For example, the judging part 36 detects a position of a shift lever of the vehicle 10 when operation of signaling lights of the vehicle 10 was detected. Further, the judging part 36 may judge that the vehicle 10 was driven forward if a speed of the vehicle 10 when operation of the signaling lights of the vehicle 10 was detected was equal to or more than a predetermined speed (for example, 30 to 50 km/h). The speed of the vehicle 10 is detected by a speed sensor provided at the vehicle 10.

If at step S204 it was judged that the vehicle 10 was not driven forward, the present control routine ends. On the other hand, if at step S204 it was judged that the vehicle 10 was driven forward, the present control routine proceeds to step S205.

At step S205, the judging part 36 judges whether the vehicle 10 was driven on a highway when operation of signaling lights of the vehicle 10 was detected. For example, the judging part 36 judges whether the vehicle 10 was driven on a highway based on the positional information of the vehicle 10 and map information. The positional information of the vehicle 10 is detected by a GPS receiver provided at the vehicle 10. The map information is stored in advance in the memory 32. Further, the judging part 36 may judge that the vehicle 10 was driven on a highway if the speed of the vehicle 10 when operation of signaling lights of the vehicle 10 was detected is equal to or more than a predetermined speed (for example, 80 to 100 km/h).

If at step S205 it is judged that the vehicle 10 was not driven on a highway, the control routine ends. On the other hand, if at step S205 it is judged that the vehicle 10 was driven on a highway, the control routine proceeds to step S206.

In the same way as step S102 and step S103 of FIG. 4, the image selecting part 35 selects training images at step S206 and sends the selected training images to the outside of the vehicle 10 at step S207. After step S207, the present control routine ends.

Note that, at least one of step S202 to step S205 may be omitted. Further, in addition to step S202 to step S205 or in place of these, other predetermined conditions may be judged.

Above, preferred embodiments according to the present invention were explained, but the present invention is not limited to these embodiments and can be corrected and changed in various ways within the language of the claims.

For example, the training image selection system 1 or 1' may be provided with only the front camera 21 as the imaging device. In this case, the predetermined range at step S102 of FIG. 4 and step S206 of FIG. 6 may be set to a range from a predetermined time before when operation of the signaling lights of the vehicle 10 was detected to when operation of the signaling lights of the vehicle 10 was detected so that images of front vehicles whose signaling lights were operated earlier than the vehicle 10 are selected as training images.

Further, the training image selection system 1 or 1' may be provided with only a rear camera 22 as an imaging device. In this case, the predetermined range at step S102 of FIG. 4 and step S206 of FIG. 6 may be set to a range from when operation of the signaling lights of the vehicle 10 was detected to a predetermined time after operation of the signaling lights of the vehicle 10 was detected so that images of rear vehicle whose signaling lights were operated later than the vehicle 10 are selected as training images.

Further, the image selecting part 35 may hold the selected training images at the memory 32 without sending them to the outside of the vehicle 10. In this case, the image selecting part 35, for example, flags the selected training images so that the selected training images are differentiated from other images. The selected training image are taken out from the vehicle 10 using a portable storage medium (semiconductor memory, magnetic recording medium, or optical recording medium) at a desired timing etc. Further, the processors 33, 33' of the ECUs 3, 3' may have learning parts and use selected training images for training the neural network by the learning parts.

REFERENCE SIGNS LIST

1, 1'. training image selection system
10. vehicle
21. front camera
22. rear camera
3, 3'. electronic control unit (ECU)
32. memory
33, 33'. processor
34. detecting part
35. image selecting part

The invention claimed is:

1. A training image selection system comprising:
a camera that captures an outside of a host vehicle to generate images,
a memory that stores the images generated by the camera, and
a processor programmed to:
detect operation of signaling lights of the host vehicle,
select training images from the images generated by the camera, and
if operation of signaling lights is detected, select images generated at timings within a predetermined range from when operation of signaling lights is detected, as training images.

2. The training image selection system according to claim 1, wherein the image selecting part configured to send the selected training images to an outside of the host vehicle.

3. The training image selection system according to claim 1, wherein the image selecting part configured to label the selected training images with the names of the signaling lights whose operation has been detected by the detecting part as true labels.

4. The training image selection system according to claim 1, wherein the memory stores only the latest images of a predetermined number of frames.

5. The training image selection system according to claim 1, wherein the camera includes a front camera capturing a region in front of the host vehicle to generate images, and a rear camera capturing a region at a rear of the host vehicle to generate images, and wherein the predetermined range includes before and after when operation of the signaling lights was detected.

6. The training image selection system according to claim 1, wherein the processor is further programmed to:
judge whether predetermined conditions have been satisfied if the operation of the signaling lights is detected, wherein
if the operation of the signaling lights is detected and the predetermined conditions have been satisfied, select the images generated at timings within the predetermined range from when operation of the signaling lights is detected, as the training images.

7. The training image selection system according to claim 6, wherein the predetermined conditions include operation of the signaling lights being continued for a predetermined time.

8. The training image selection system according to claim 6, wherein the predetermined conditions include another vehicle being detected from at least one of the images generated at timings within the predetermined range from when operation of the signaling lights is detected.

9. The training image selection system according to claim 6, wherein the predetermined conditions include the host vehicle being driven forward when operation of the signaling lights is detected.

10. The training image selection system according to claim 6, wherein the predetermined conditions include the host vehicle being driven on a highway when operation of the signaling lights is detected.

11. A training image selection system comprising:
an imaging device capturing an outside of a host vehicle to generate images,
a storage device storing the images generated by the imaging device, and
a control device, wherein
the control device is configured to detect operation of signaling lights of the host vehicle, select training images from the images generated by the imaging device, and select images generated at timings within a predetermined range from when operation of signaling lights is detected, as training images, if detecting operation of signaling lights.

\* \* \* \* \*